(12) United States Patent
Jeong et al.

(10) Patent No.: US 11,054,188 B2
(45) Date of Patent: Jul. 6, 2021

(54) HEAT EXCHANGER

(71) Applicant: KYUNGDONG NAVIEN CO., LTD., Pyeongtaek-si (KR)

(72) Inventors: Inchul Jeong, Seoul (KR); Jun Gil Park, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 227 days.

(21) Appl. No.: 16/072,266

(22) PCT Filed: Feb. 3, 2017

(86) PCT No.: PCT/KR2017/001186
§ 371 (c)(1),
(2) Date: Jul. 24, 2018

(87) PCT Pub. No.: WO2017/135730
PCT Pub. Date: Aug. 10, 2017

(65) Prior Publication Data
US 2019/0033004 A1    Jan. 31, 2019

(30) Foreign Application Priority Data
Feb. 5, 2016  (KR) .................. 10-2016-0015064

(51) Int. Cl.
*F24H 1/34*  (2006.01)
*F24H 1/40*  (2006.01)
(Continued)

(52) U.S. Cl.
CPC ............... *F28D 9/005* (2013.01); *F24H 1/34* (2013.01); *F24H 1/40* (2013.01); *F24H 9/00* (2013.01);
(Continued)

(58) Field of Classification Search
CPC ..... F24H 1/30; F24H 1/32; F24H 1/34; F24H 1/40; F24H 9/00; F24H 9/0015;
(Continued)

(56) References Cited

U.S. PATENT DOCUMENTS

| 10,126,014 B2 * | 11/2018 | Kim | ..................... F24H 9/146 |
| 2005/0082049 A1 * | 4/2005 | Brost | ..................... F28D 9/005 |
| | | | 165/166 |
| 2017/0059201 A1 * | 3/2017 | Kim | ..................... F24H 1/38 |

FOREIGN PATENT DOCUMENTS

| JP | 2006-214628 A | 8/2006 |
| JP | 2012-122663 A | 6/2012 |

(Continued)

OTHER PUBLICATIONS

International Search Report dated May 19, 2017, issued by the Korean Intellectual Property Office in corresponding application PCT/KR2017/001186.

*Primary Examiner* — Edward F Landrum
*Assistant Examiner* — Chang H Park
(74) *Attorney, Agent, or Firm* — Stein IP, LLC

(57) ABSTRACT

An embodiment of the present subject matter includes a heat exchange part having heating medium channels, through which heating medium flows, and combustion gas channels, through which combustion gas burned in a burner flows, adjacently disposed in alternation in the spaces between the plurality of plates, wherein the heat exchange part surrounds the outer sides of a central combustion chamber space, a plurality of the heat exchange parts are provided in a stacked structure, and the flow direction of the heating medium is unidirectional only in a part of the heating medium channels from among the heating medium channels provided in each layer.

11 Claims, 16 Drawing Sheets

(51) Int. Cl.
   *F24H 9/00*     (2006.01)
   *F24H 9/12*     (2006.01)
   *F28D 20/02*    (2006.01)
   *F28D 9/00*     (2006.01)
   *F28F 3/00*     (2006.01)
   *F28F 3/08*     (2006.01)

(52) U.S. Cl.
   CPC ............ *F24H 9/0015* (2013.01); *F24H 9/122* (2013.01); *F28D 9/00* (2013.01); *F28D 20/02* (2013.01); *F28F 3/00* (2013.01); *F28F 3/08* (2013.01); *F28F 2210/02* (2013.01); *Y02E 60/14* (2013.01)

(58) Field of Classification Search
   CPC .. F24H 9/122; F28D 20/02; F28D 2021/0024; F28D 9/00; F28D 9/0012; F28D 9/0043; F28D 9/005; F28F 2210/02; F28F 3/00; F28F 3/042; F28F 3/044; F28F 3/046; F28F 3/08; F28F 3/086; Y02E 60/145
   See application file for complete search history.

(56) References Cited

FOREIGN PATENT DOCUMENTS

| | | |
|---|---|---|
| KR | 10-0813807 B1 | 3/2008 |
| KR | 10-2013-0052912 A | 5/2013 |
| KR | 10-2015-0108540 A | 9/2015 |
| KR | 10-2015-0108959 A | 10/2015 |
| WO | WO 2015/142003 A1 | 9/2015 |

* cited by examiner

[FIG. 9]
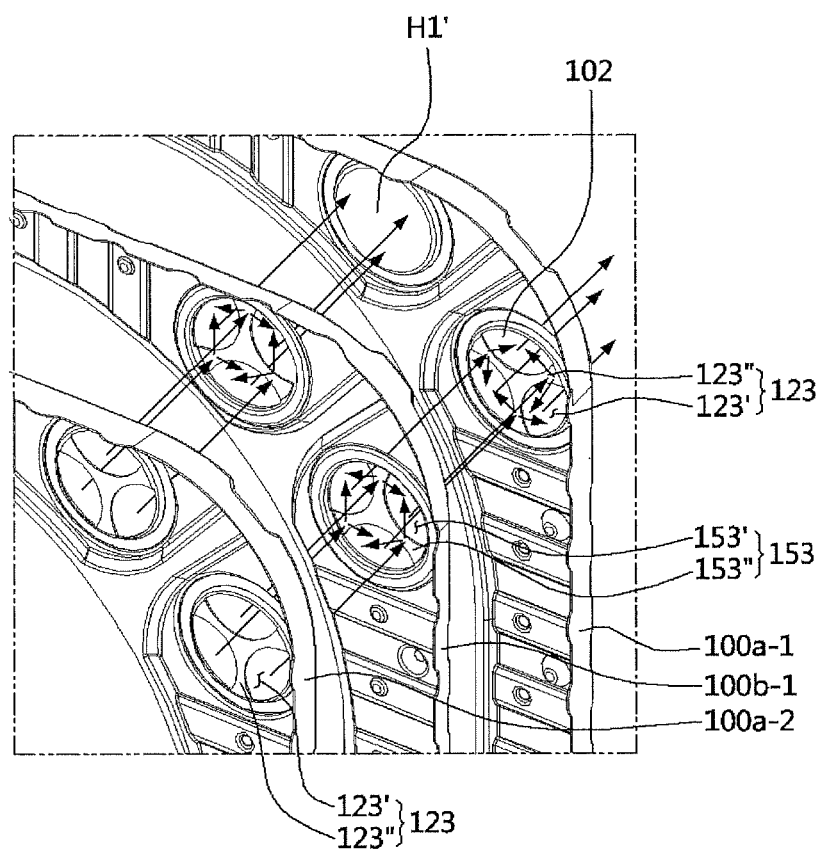

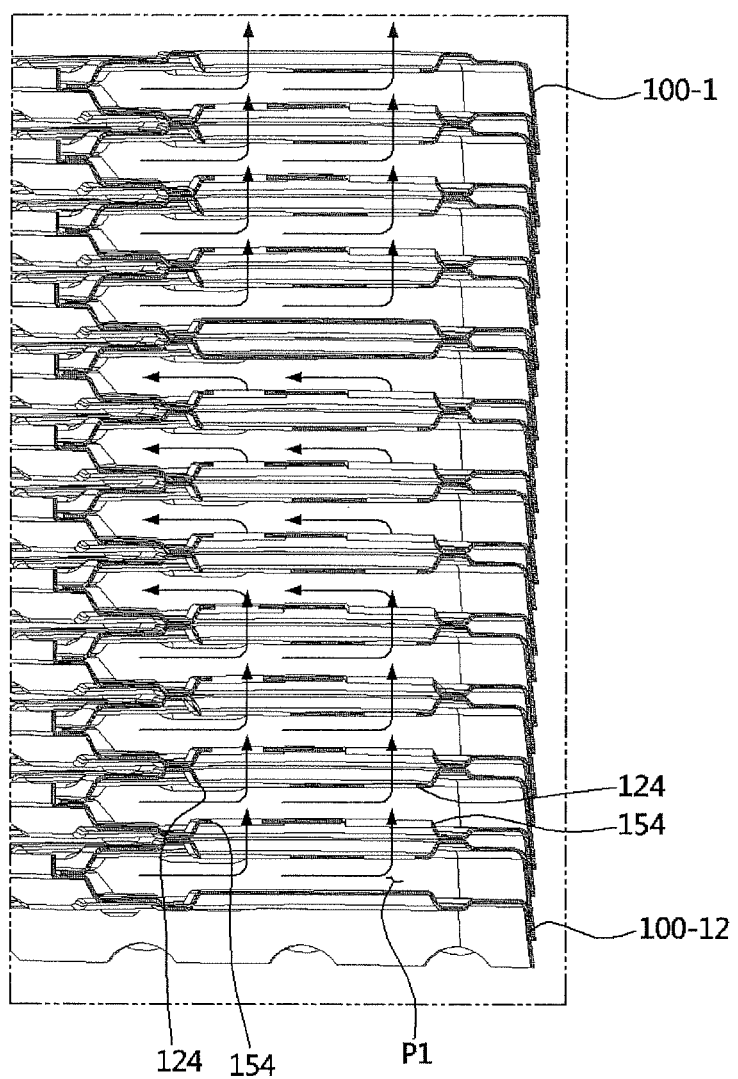
[FIG. 10]

[FIG. 11]
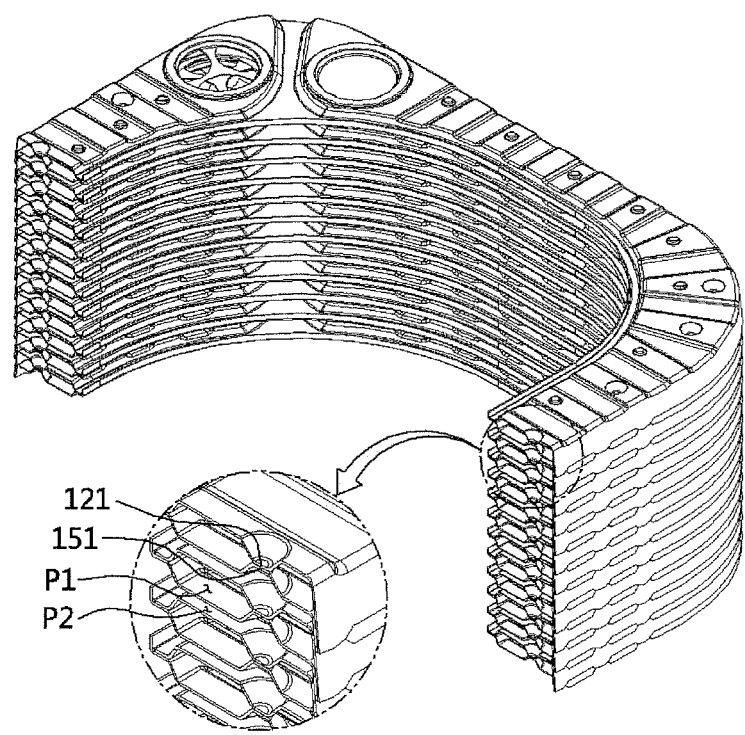

[FIG. 12]
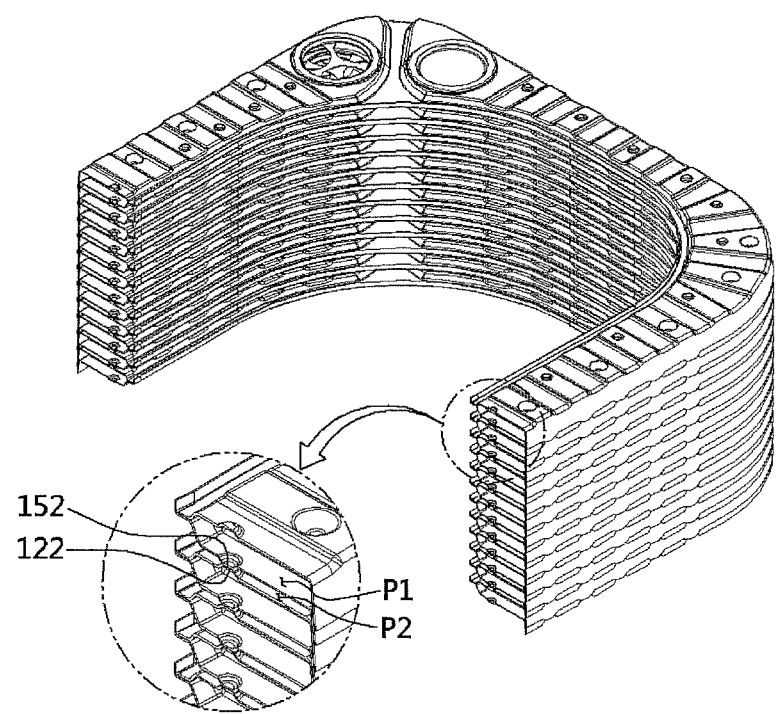

[FIG. 13]
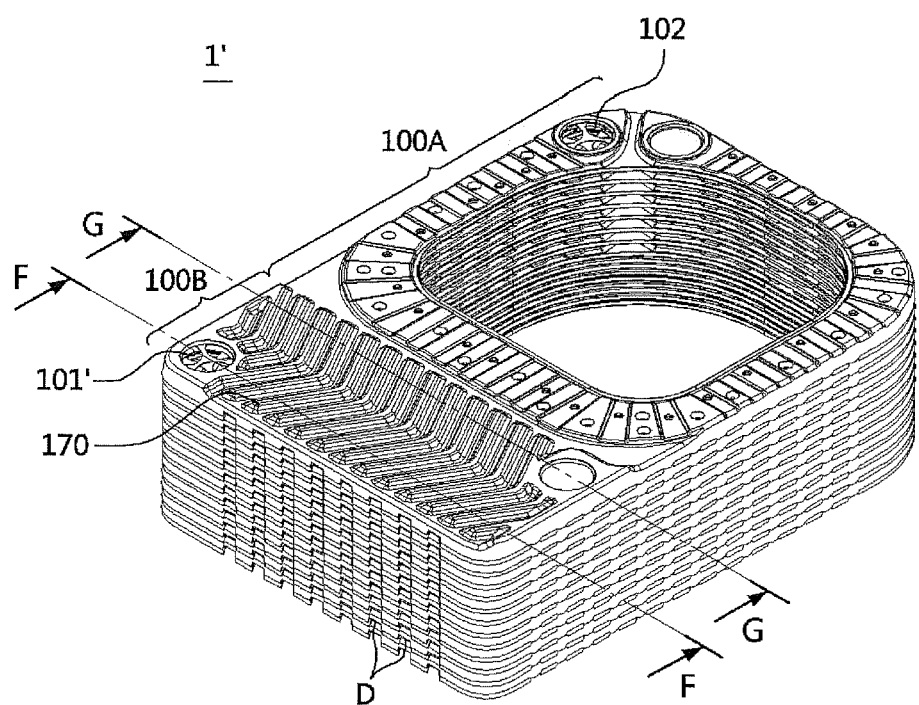

[FIG. 14]
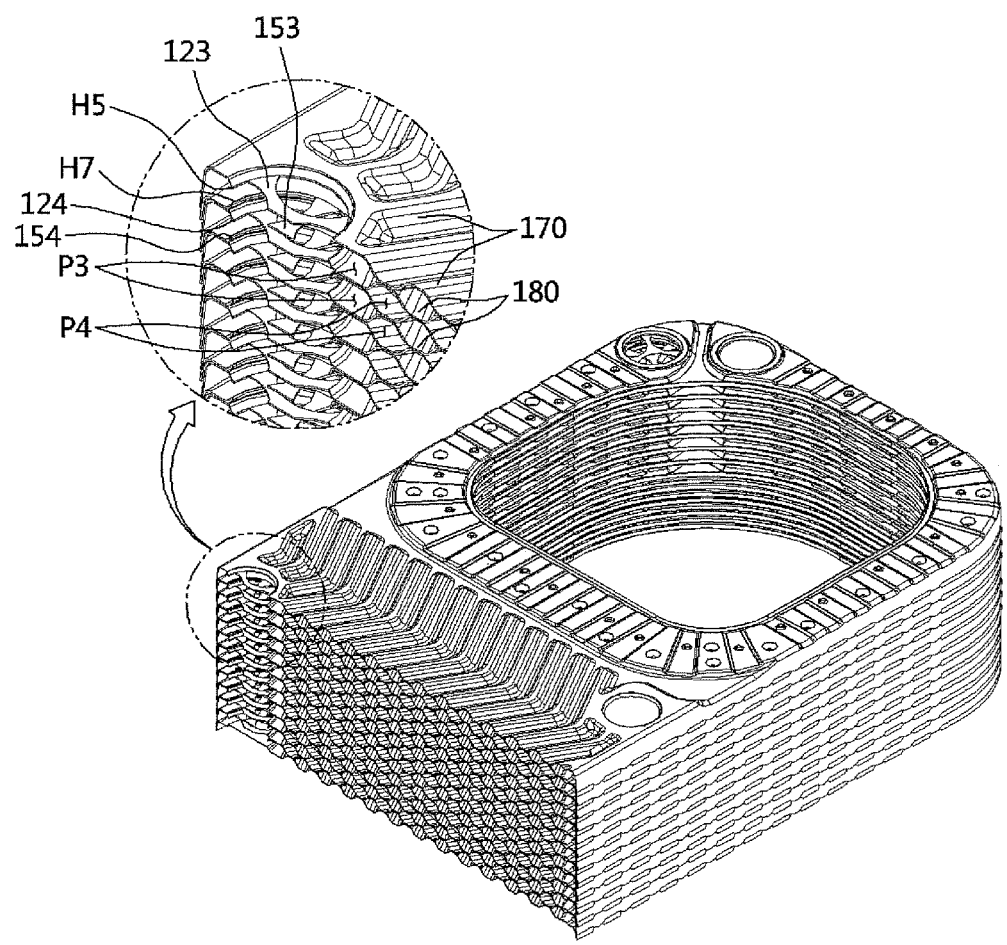

[FIG. 15]
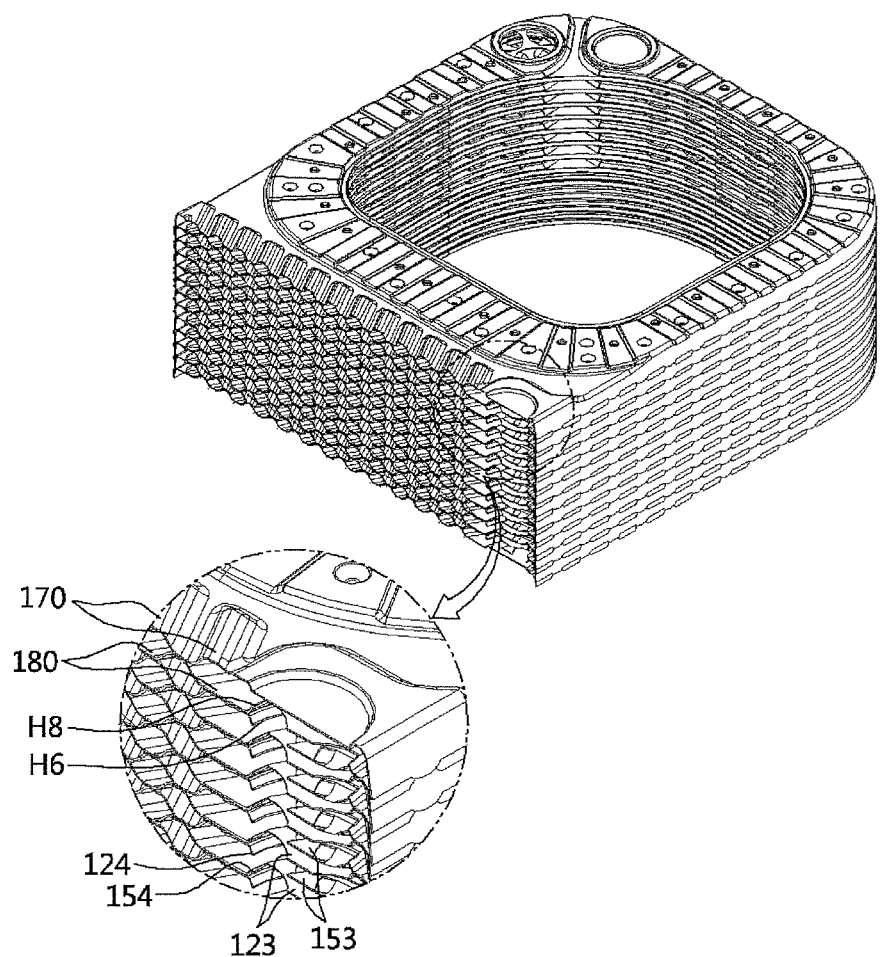

[FIG. 16]
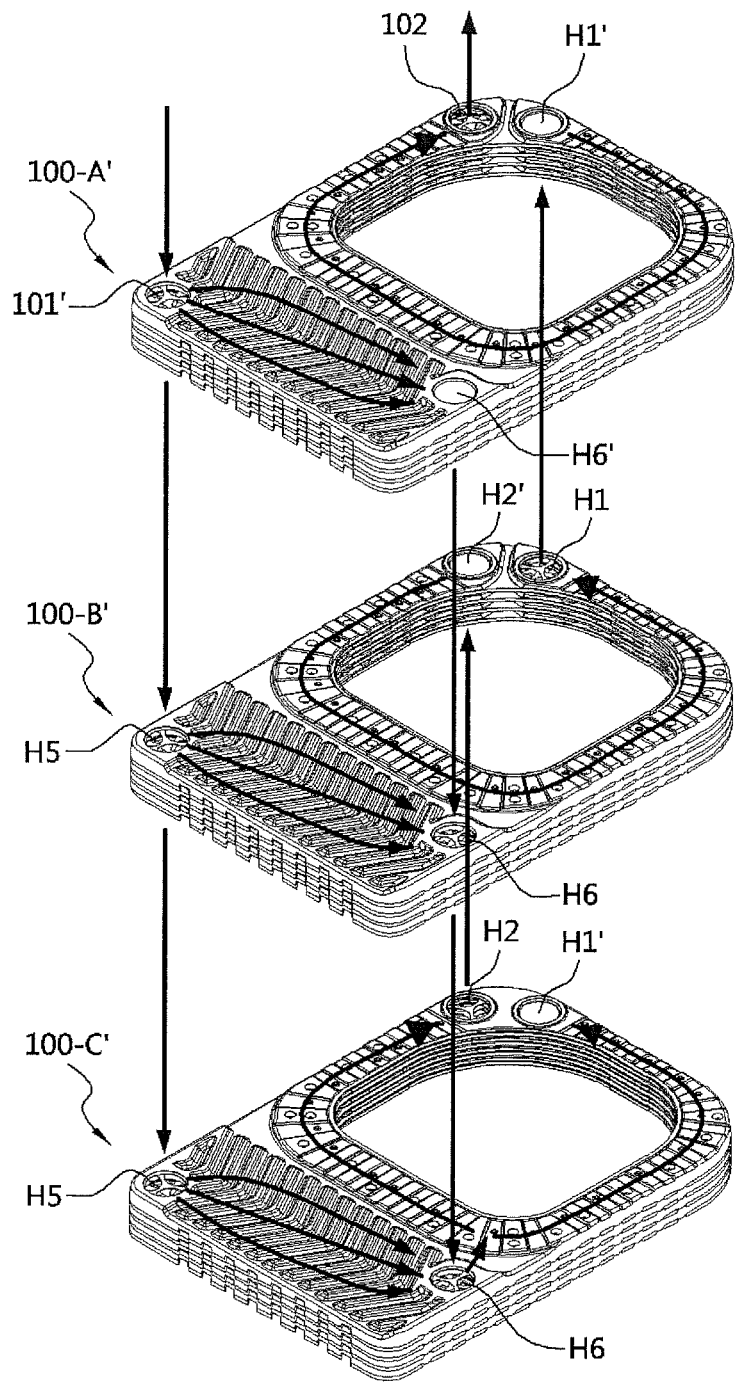

HEAT EXCHANGER

This application is a national stage of International Application No. PCT/KR2017/001186, filed Feb. 3, 2017, which claims the benefit of priority to Korean Application No. 10-2016-0015064, filed Feb. 5, 2016, in the Korean Intellectual Property Office, the disclosure of which is incorporated herein by reference.

TECHNICAL FIELD

The present invention relates to a heat exchanger, and more particularly, to a heat exchanger capable of minimizing a pressure drop of a heating medium, preventing local overheating thereof, and thus improving efficiency of heat exchange by allowing the heating medium, which flows along a heating medium channel formed between plates, to smoothly circulate, as well as being capable of being easily manufactured.

BACKGROUND ART

A boiler used for providing heating or hot water is a device configured to heat a desired site or supply hot water by heating tap water or heating water (hereinafter referred to as a "heating medium") with a heat source, wherein the boiler includes a burner configured to burn a mixture of a gas and air and a heat exchanger configured to transfer combustion heat of a combustion gas to a heating medium.

As an example of a related art relating to a conventional heat exchanger, Korean Registered Patent No. 10-0813807 discloses a heat exchanger including a burner disposed at a central portion of the heat exchanger and a heat exchange tube wound around a circumference of the burner in the form of a coil.

The heat exchanger disclosed in the above-described Patent Document has problems in that, since the heat exchange tube is formed in a flat shape, the heat exchange tube is deformed into a rounded shape when a pressure is applied to a heat transfer medium portion, and, since the heat exchange tube is formed to be rolled up, a thickness of the heat transfer medium portion becomes thicker.

Further, since the conventional heat exchanger has a structure in which the heat exchange tube is wound around a combustion chamber in the form of a coil, heat exchange between the combustion gas and a heating medium is performed only in a local space around the heat exchanger formed in the form of a coil such that there is a disadvantage in that a heat transfer area cannot be widely secured.

In order to resolve such a problem, a plate-shaped heat exchanger has recently been developed in which a plurality of plates are stacked and thus a heating medium channel and a combustion gas channel are formed in the plurality of stacked plates such that heat exchange between a heating medium and a combustion gas is performed.

However, the conventional plate-shaped heat exchanger has problems in that a pressure drop and reduction in flow velocity of the heating medium occur while the heating medium flows between the plurality of stacked plates, and thus the heating medium is locally overheated which causes generation of noise and foreign materials.

Particularly, when a plurality of plates are formed in an upright structure, there is a problem in that a heating medium flows only to some regions of a heating medium channel due to the effect of gravity, and air resides in the remaining region of the heating medium channel such that efficiency of heat exchange is degraded.

DISCLOSURE

Technical Problem

The present invention is directed to providing a heat exchanger capable of minimizing a pressure drop of a heating medium, preventing local overheating thereof, and thus improving efficiency of heat exchange by allowing the heating medium, which flows along a heating medium channel formed between plates, to smoothly circulate, as well as being capable of being easily manufactured.

Technical Solution

One aspect of the present invention provides a heat exchanger including a heat exchange part in which a heating medium channel (P1), through which a heating medium flows, and a combustion gas channel (P2), through which a combustion gas combusted in a burner flows, are alternately formed adjacent to each other in a space between a plurality of plates, wherein the heat exchange part is configured to surround an outer side of a space of a combustion chamber (C) provided at a central portion of the heat exchange part, and the heat exchange part is provided in a stacked structure of a plurality of heat exchange parts, and some heating medium channels (P1) provided in layers are formed to direct a flow direction of the heating medium in one direction.

Advantageous Effects

In accordance with a heat exchanger of the present invention, a flow direction of a heating medium circulating along a circumference of a combustion chamber is formed in one direction, and thus heating medium circulates smoothly so that a pressure drop of the heating medium can be minimized and local overheating of the heating medium can be prevented to improve efficiency of heat exchange.

Further, a plurality of heat exchange parts are provided to surround an outer space of a combustion chamber and to be stacked in the outer space, heating medium channels are formed in series between the plurality of heat exchange parts, and the heating medium channels are formed in parallel inside each of the plurality of heat exchange parts so that a capacity of the heat exchanger can be increased without a pressure drop of a heating medium by adjusting the number of the parallel heating medium channels when the capacity of the heat exchanger is increased.

Furthermore, a plurality of plates are stacked to integrally manufacture a sensible heat part and a latent heat part so that the number of parts of the heat exchanger can be reduced, a production process can be simplified, and production automation can be achieved.

Moreover, a stepped level is formed on a surface of each of a first protruding portion and a first recessed portion, and protrusions are configured to be brought into contact with each other at corresponding positions in a heating medium channel and a combustion gas channel so that generation of turbulent flows of the heating medium and the combustion gas is induced such that efficiency of heat exchange can be improved, and, at the same time, deformation of the plurality of plates due to a pressure of fluid can be prevented and pressure resistance performance can be improved.

DESCRIPTION OF DRAWINGS

FIG. 9 is a partial perspective view for describing an action of a heating medium dispersion portion.

FIG. 10 is a cross sectional view taken along the line C-C of FIG. 2 for describing an action of a heating medium distribution portion.

FIG. 11 is a cross-sectional perspective view taken along the line D-D in FIG. 2.

FIG. 12 is a cross-sectional perspective view taken along the line E-E in FIG. 2.

FIG. 13 is a perspective view of a heat exchanger according to another embodiment of the present invention.

FIG. 14 is a cross-sectional perspective view taken along the line F-F in FIG. 13.

FIG. 15 is a cross-sectional perspective view taken along the line G-G in FIG. 13.

FIG. 16 is a perspective view illustrating a flow path of a heating medium.

Description of Reference Numerals

Figure 1:
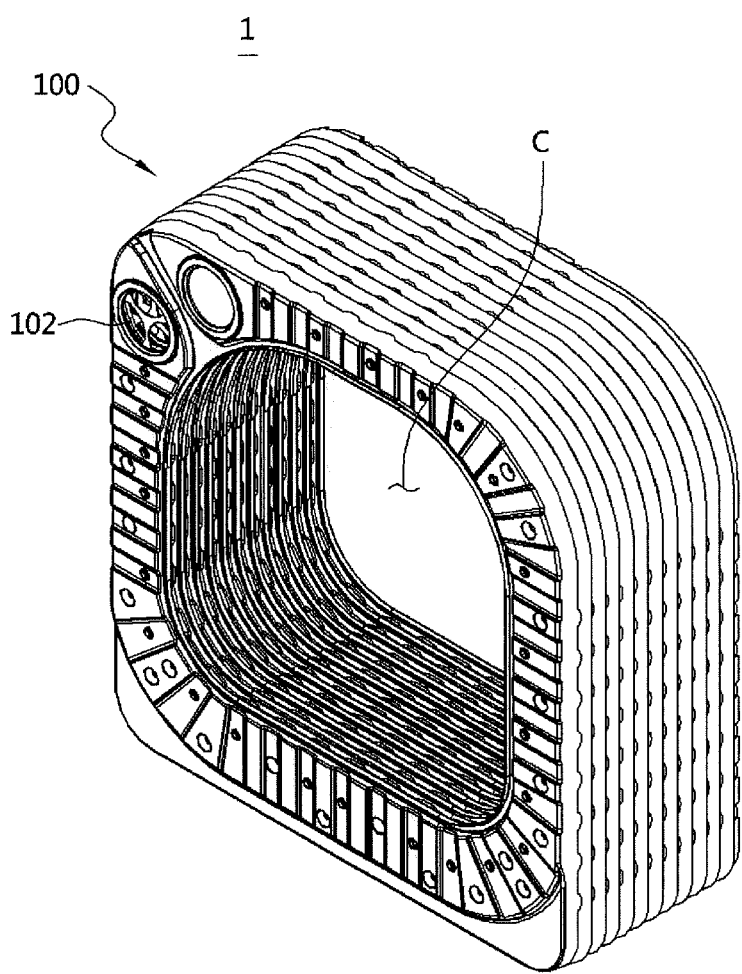
FIG. 1 is a perspective view of a heat exchanger according to one embodiment of the present invention.
Figure 2:
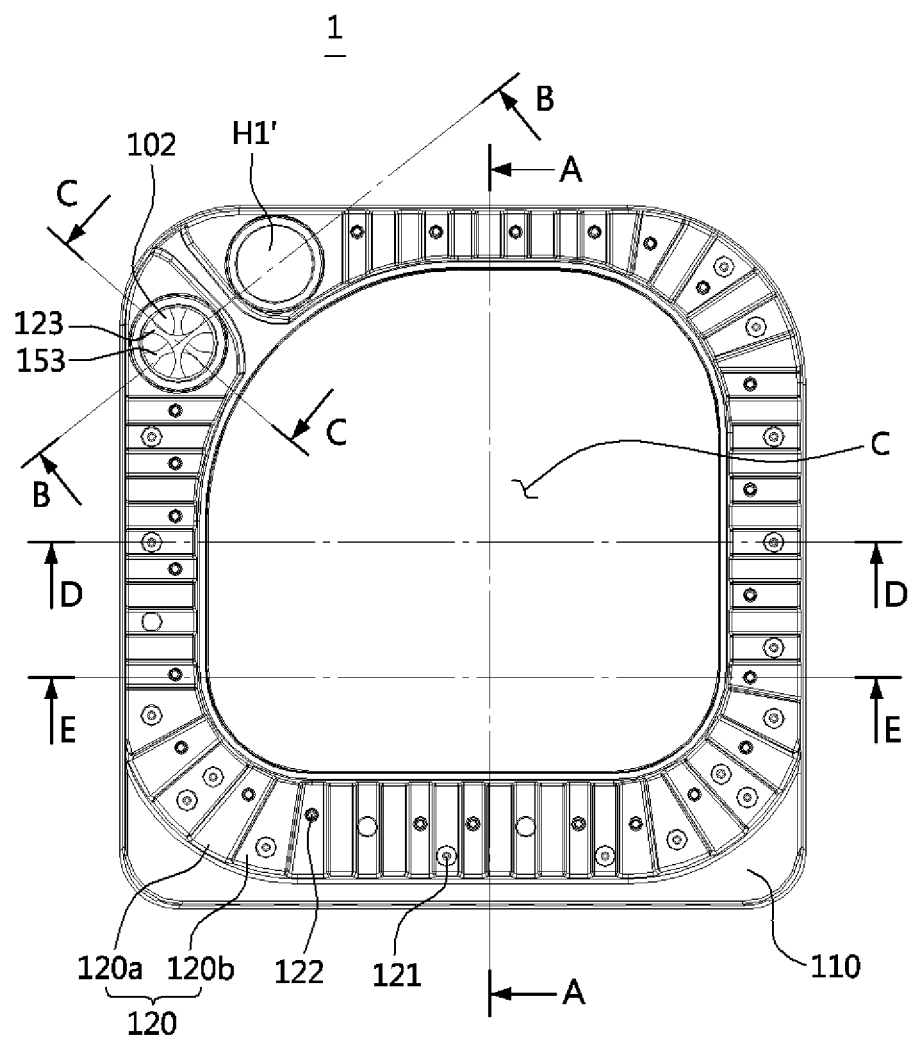
FIG. 2 is a front view of the heat exchanger according to one embodiment of the present invention.

| | |
|---|---|
| 1 and 1': heat exchangers | 100: heat exchange part |
| 100-A and 100-A': first heat exchange parts | |
| 100-B and 100-B': second heat exchange parts | |
| 100-C and 100-C': third heat exchange parts | |
| 100A: sensible heat part | 100B: latent heat part |
| 100-1 to 100-12: unit plates | 100a-1 to 100a-12: first plates |
| 100b-1 to 100b-12: second plates | |
| 101 and 101': heating medium inlets | 102: heating medium outlet |
| 110: first flat surface | 120: first protruding portion |
| 120a: first protruding piece | 120b: second protruding piece |
| 121: first protrusion | 122: second protrusion |
| 123: first heating medium dispersion portion | |
| 123': first opened portion | 123": first blocked portion |
| 124: first heating medium distribution portion | |
| 130: first flange | 131: first incised portion |
| 140: second flat surface | 150: first recessed portion |
| 150a: first recessed piece | 150b: second recessed piece |
| 151: third protrusion | 152: fourth protrusion |
| 153: second heating medium dispersion portion | |
| 153': second opened portion | 153": second blocked portion |
| 154: second heating medium distribution portion | |
| 160: second flange | 161: second incised portion |
| 170: second protruding portion | 180: second recessed portion |
| A1: first opening | A2: second opening |

Description of Reference Numerals

| | |
|---|---|
| C: combustion chamber | H1 to H8: through-holes |
| H1', H2', H3', and H4': blocked portions | |
| P1: heating medium channel | |
| P2: combustion gas channel | |
| P3: latent heat part heating medium channel | |
| P4: latent heat part combustion gas channel | |

MODES OF THE INVENTION

Hereinafter, configurations and operations for preferred embodiments of the present invention will be described in detail with reference to the accompanying drawings.

Referring to FIGS. 1 to 7, a heat exchanger 1 according to one embodiment of the present invention includes a heat exchange part 100 configured with a plurality of plates stacked at a circumference of a combustion chamber C in which combustion heat and a combustion gas are generated by combustion of a burner (not shown).

The heat exchange part 100 may have a structure in which a plurality of plates are to be upright along a longitudinal direction and are stacked from a front side to a rear side, and a plurality of heat exchange parts 100-A, 100-B, and 100-C are stacked. Therefore, the burner may be assembled by being horizontally inserted into the combustion chamber C from the front side, and thus convenience in attachment or detachment of the burner and in maintenance of the heat exchanger 1 may be improved.

For example, the plurality of plates may be configured with first to twelfth unit plates 100-1, 100-2, 100-3, 100-4, 100-5, 100-6, 100-7, 100-8, 100-9, 100-10, 100-11, and 100-12, and the first to twelfth unit plates 100-1, 100-2, 100-3, 100-4, 100-5, 100-6, 100-7, 100-8, 100-9, 100-10, 100-11, and 100-12 are configured with first plates 100a-1, 100a-2, 100a-3, 100a-4, 100a-5, 100a-6, 100a-7, 100a-8, 100a-9, 100a-10, 100a-11, and 100a-12, which are disposed at front positions of the first to twelfth unit plates 100-1, 100-2, 100-3, 100-4, 100-5, 100-6, 100-7, 100-8, 100-9, 100-10, 100-11, and 100-12, respectively, and second plates 100b-1, 100b-2, 100b-3, 100b-4, 100b-5, 100b-6, 100b-7, 100b-8, 100b-9, 100b-10, 100b-11, and 100b-12, which are stacked in rear of the first plates 100a-1, 100a-2, 100a-3, 100a-4, 100a-5, 100a-6, 100a-7, 100a-8, 100a-9, 100a-10, 100a-11, and 100a-12, respectively.

A heating medium channel P1, through which a heating medium flows, is formed between a first plate and a second plate constituting each unit plate, and a combustion gas channel P2, through which a combustion gas flows, is formed between a second plate constituting one unit plate, which is disposed at one side, among adjacently stacked unit plates and a first plate constituting another unit plate, which is disposed at the other side, thereamong. The heating medium channel P1 and the combustion gas channel P2 are alternately formed adjacent to each other between the plurality of plates to allow heat exchange between the heating medium and the combustion gas.

Figure 3:
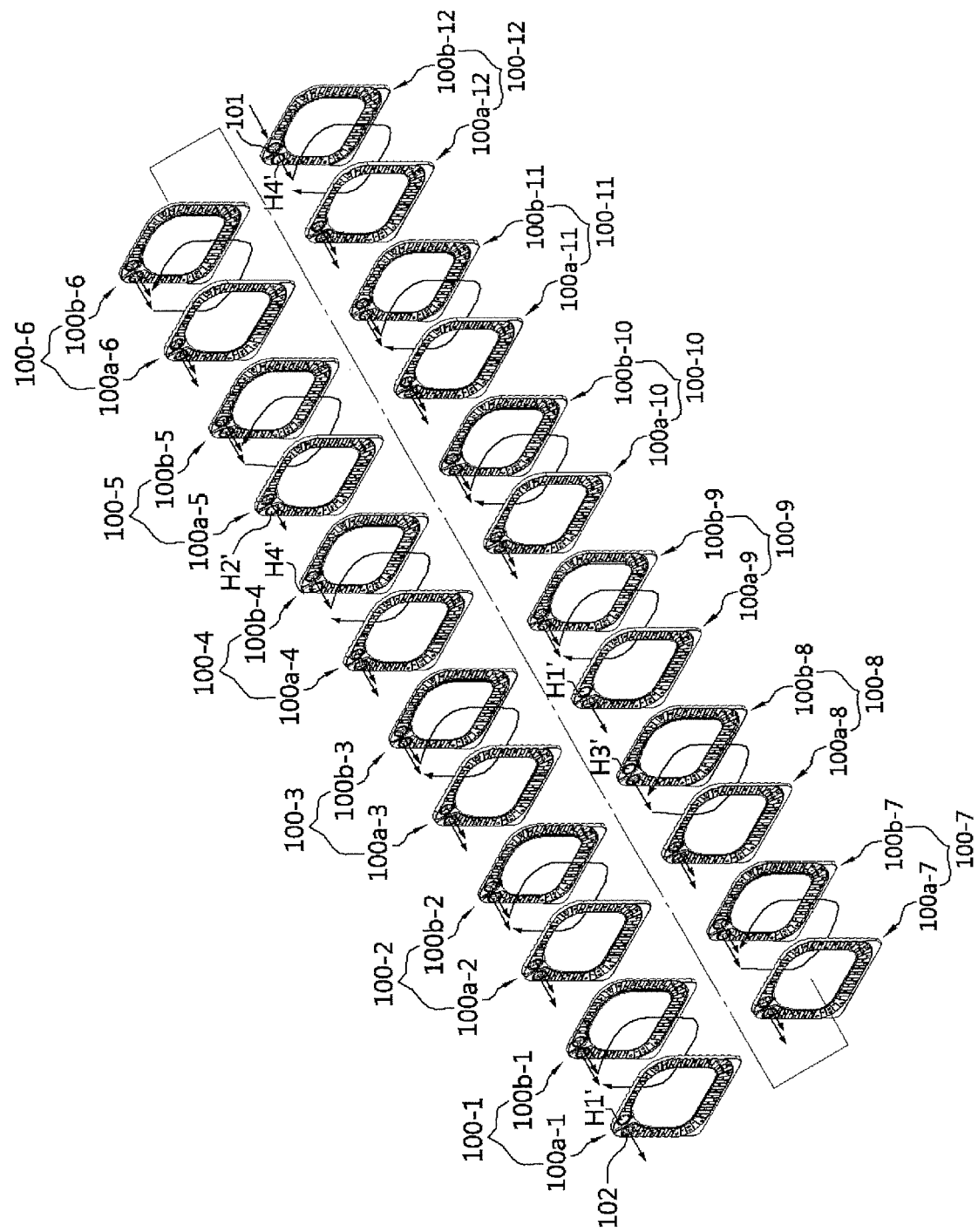
FIG. 3 is an exploded perspective view of the heat exchanger according to one embodiment of the present invention.
Figure 4:
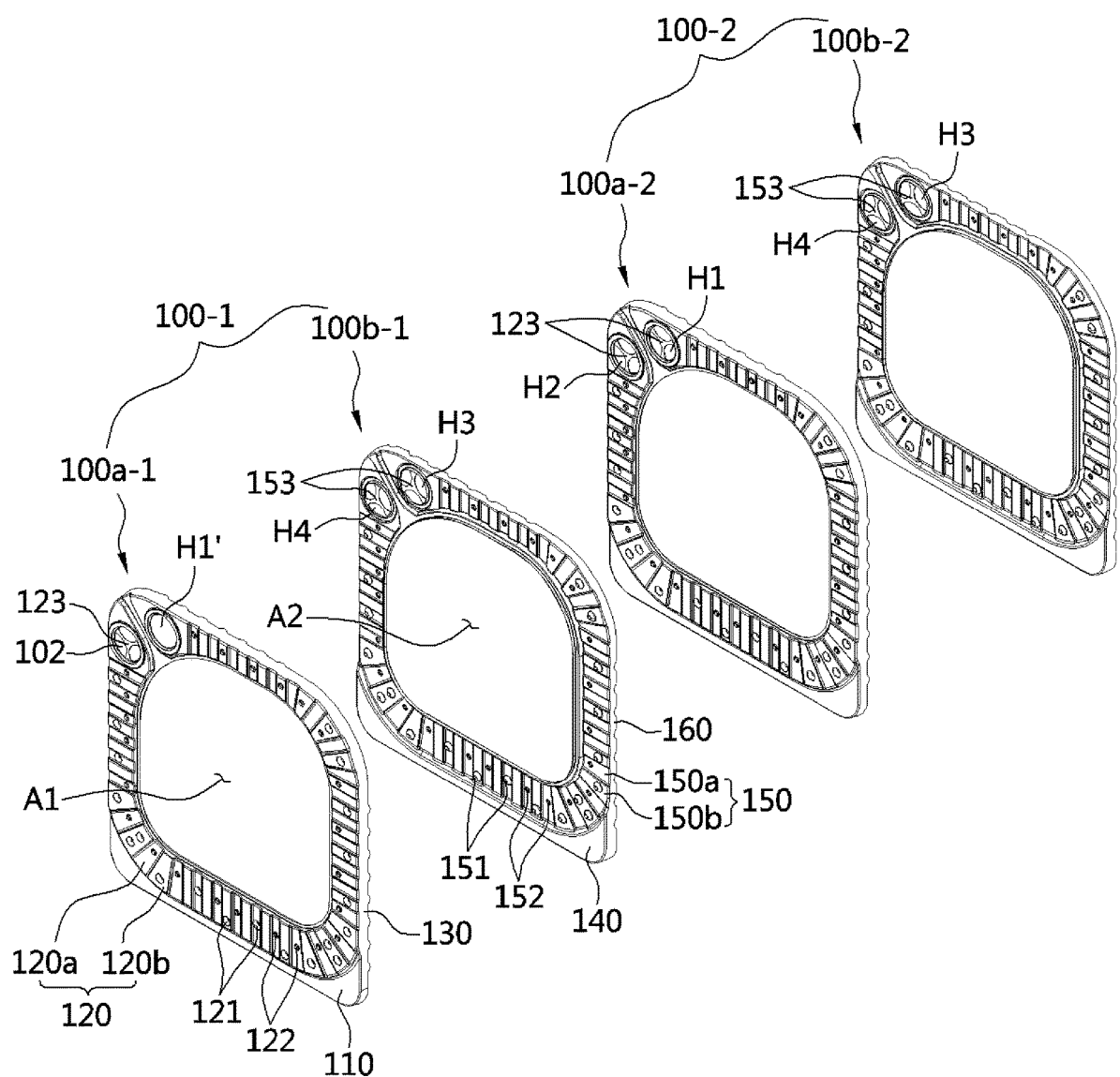
FIG. 4 is an enlarged perspective view of some unit plates shown in FIG. 3.
Figure 5:
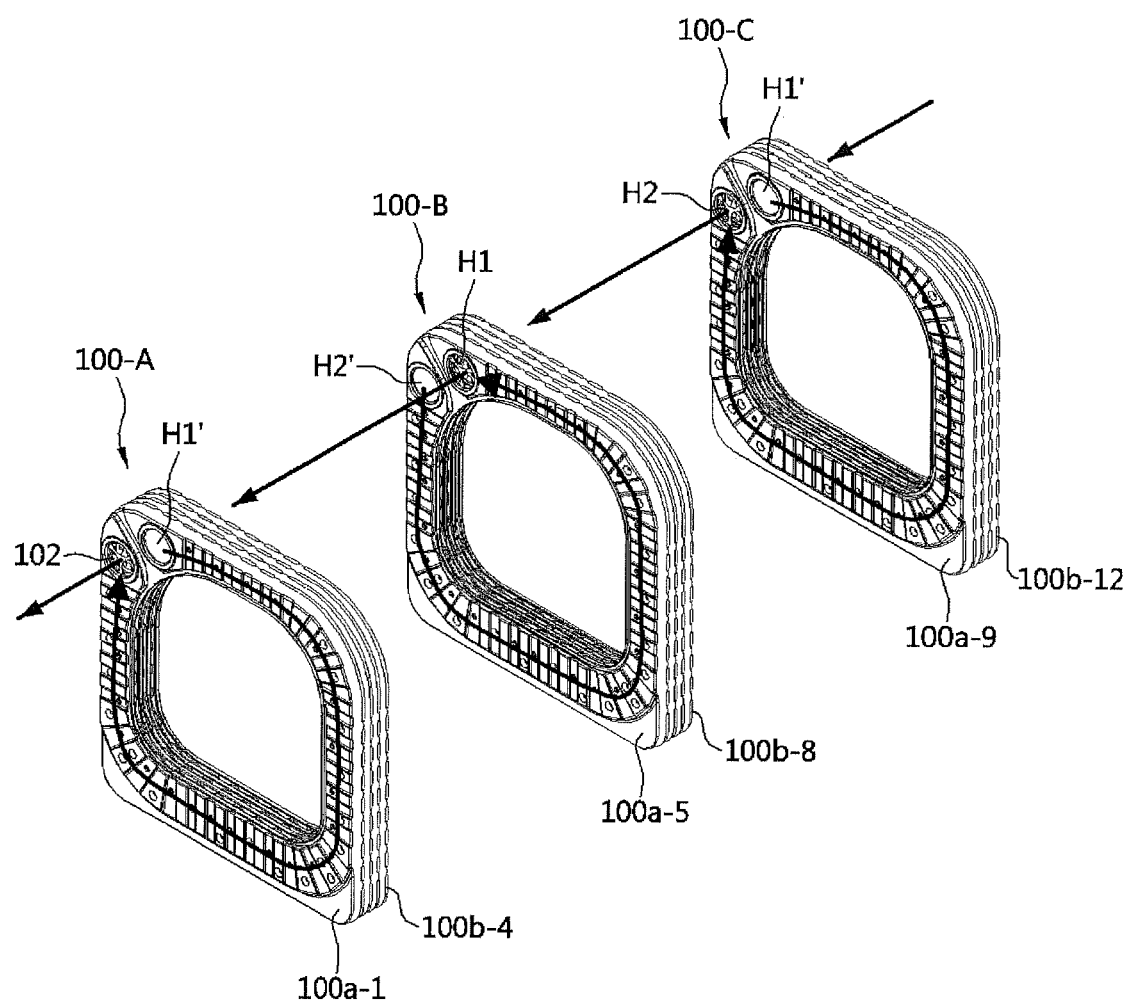
FIG. 5 is a perspective view illustrating a flow path of a heating medium.

Referring to FIGS. 3 to 5, the first plate includes a first flat surface 110 having a first opening A1 formed at a central portion thereof, a first protruding portion 120 formed to protrude from the first flat surface 110 to the front side and having sections being communicated in a circumferential direction, and a first flange 130 extending from an edge of the first flat surface 110 to the rear side.

The second plate includes a second flat surface 140 having a second opening A2 formed at a central portion thereof to correspond to the first opening A1 in front and rear directions and configured to be brought into contact with the first flat surface 110, a first recessed portion 150 formed to protrude from the second flat surface 140 to the rear side, having sections being communicated in a circumferential direction, and configured to form the heating medium channel P1 between the first protruding portion 120 and the first recessed portion 150, and a second flange 160 extending from an edge of the second flat surface 140 to the rear side and configured to be coupled to a first flange 130 of a unit plate disposed next to the second plate.

In FIGS. 3 and 5, arrows indicate flow directions of the heating medium.

Referring to FIG. 5, the heat exchange part 100 is configured in a structure in which a plurality of heat exchange parts are stacked, and, for example, the heat exchange part 100 may be configured with first heat exchange part 100-A, a second heat exchange part 100-B, and a third heat exchange part 100-C.

The heating medium channel P1 in the plurality of heat exchange parts 100-A, 100-B, and 100-C is configured such that a flow direction of the heating medium is directed in only one direction. That is, a flow direction of a heating medium in each of the plurality of heat exchange parts 100-A, 100-B, and 100-C is directed in one direction, but flow directions of heating media in adjacent heat exchange parts among the plurality of heat exchange units 100-A, 100-B, and 100-C are formed in series and directed in opposite directions (a clockwise direction and a counterclockwise direction).

Further, the heating medium channels P2 are formed in parallel at a plurality of unit plates constituting each of the heat exchange parts 100-A, 100-B, and 100-C.

A configuration for a unidirectional flow of the heating medium will be described below.

Referring to FIG. 5, a heating medium inlet and a heating medium outlet are formed at one side of each of the plurality of heat exchange parts 100-A, 100-B, and 100-C at an adjacent interval, a blocked shape is formed between the heating medium inlet and the heating medium outlet which are positioned adjacent to each other in each of the plurality of heat exchange parts 100-A, 100-B, and 100-C, and a heating medium inlet and a heating medium outlet formed at one heat exchange part among adjacently stacked heat exchange parts 100-A and 100-B, or 100-B and 100-C are formed at positions in reverse to positions of a heating medium inlet and a heating medium outlet formed at another heat exchange part thereamong.

Here, the "heating medium inlet" and the "heating medium outlet" are defined such that a heating medium inlet of the third heat exchange part 100-C means a heating medium inlet 101 formed in the second plate 100b-12 of the twelfth unit plate 100-12, a heating medium outlet of the third heat exchange part 100-C means a second through-hole H2 formed in the first plate 100a-9 of the ninth unit plate 100-9, a heating medium inlet of the second heat exchange part 100-B means a fourth through-hole H4 formed in the second plate 100b-8 of the eighth unit plate 100-8, a heating medium outlet of the second heat exchange part 100-B means a first through-hole H1 formed in the first plate 100a-5 of the fifth unit plate 100-5, a heating medium inlet of the first heat exchange part 100-A means a third through-hole H3 formed in the second plate 100b-4 of the fourth unit plate 100-4, and a heating medium outlet of the first heat exchange part 100-A means a heating medium outlet 102 formed in the first plate 100a-1 of the first unit plate 100-1.

Referring to FIGS. 3 and 4, the first through-hole H1 and the second through-hole H2 are formed adjacent to each other at one side of an upper portion of the first plate, and the third through-hole H3 corresponding to the first through-hole H1 and the fourth through-hole H4 corresponding to the second through-hole H2 are formed at one side of an upper portion of the second plate.

At one side of an upper portion of the first plate 100a-1 disposed at a foremost position, a first blocked portion H1' is formed at a position corresponding to the first through-hole H1, and the heating medium outlet 102 is formed at a position corresponding to the second through-hole H2.

At one side of an upper portion of the second plate 100b-12 disposed at a rearmost position, the heating medium inlet 101 is formed at a position corresponding to the third through-hole H3, and a fourth blocked portion H4' is formed at a position corresponding to the fourth through-hole H4.

Further, the fourth blocked portion H4' is formed at a position corresponding to the fourth through-hole H4 on the second plate 100b-4 of the fourth unit plate 100-4, a second blocked portion H2' is formed at a position corresponding to the second through-hole H2 on the first plate 100a-5 of the fifth unit plate 100-5, a third blocked portion H3' is formed at a position corresponding to the third through-hole H3 on the second plate 100b-8 of the eighth unit plate 100-8, and the first blocked portion H1' is formed at a position corresponding to the first through-hole H1 on the first plate 100a-9 of the ninth plate 100-9.

Therefore, a heating medium flowing into the heating medium channel P1 of the twelfth unit plate 100-12 through the heating medium inlet 101 formed in the second plate 100b-12 of the twelfth unit plate 100-12 disposed at the rearmost position flows to the front side through the first to fourth through-holes H1, H2, H3, and H4 formed in the twelfth to ninth unit plates 100-12, 100-11, 100-10, and 100-9, and at the same time, since the first blocked portion H1' is formed at the first plate 100a-9 of the nine unit plate 100-9, the heating medium flows in a clockwise direction in the heating medium channels P1 inside the twelfth to ninth unit plates 100-12, 100-11, 100-10, and 100-9.

Further, the heating medium flowing into the heating medium channel P1 of the eighth unit plate 100-8 through the second through-hole H2 formed in the first plate 100a-9 of the ninth unit plate 100-9 and the fourth through-hole H4 formed in the second plate 100b-8 of the eighth unit plate 100-8 flows to the front side through the first to fourth through-holes H1, H2, H3, and H4 formed in the eighth to fifth unit plates 100-8, 100-7, 100-6, and 100-5, and at the same time, since the second blocked portion H2' is formed at the first plate 100a-5 of the fifth unit plate 100-5, the heating medium flows in a counterclockwise direction in the heating medium channels P1 inside the eighth to fifth unit plates 100-8, 100-7, 100-6, and 100-5.

Furthermore, the heating medium flowing into the heating medium channel P1 of the fourth unit plate 100-4 through the first through-hole H1 formed in the first plate 100a-5 of the fifth unit plate 100-5 and the third through-hole H3 formed in the second plate 100b-4 of the fourth unit plate 100-4 flows to the front side through the first to fourth through-holes H1, H2, H3, and H4 formed in the fourth to first unit plates 100-4, 100-3, 100-2, and 100-1, and at the same time, since the first blocked portion H1' is formed at the first plate 100a-1 of the first unit plate 100-1, the heating medium flows in the clockwise direction in the heating medium channels P1 inside the fourth to first unit plates 100-4, 100-3, 100-2, and 100-1.

As described above, in the structure in which the heat exchange part 100 is formed to be upright along a longitudinal direction, heating medium connection channels configured with the heating medium channels P1 and the first to fourth through-holes H1, H2, H3, and H4 are formed to allow the heating medium to flow in one direction so that the heating medium flowing along the circumference of the combustion chamber C circulates smoothly such that a pressure drop of the heating medium is minimized and local overheating thereof is prevented, thus improving thermal efficiency.

Further, a capacity of the heat exchanger may be increased without a pressure drop by adjusting the number of parallel channels in each of the heat exchange parts 100-A, 100-B, and 100-C when the capacity of the heat exchanger is increased.

Figure 6:
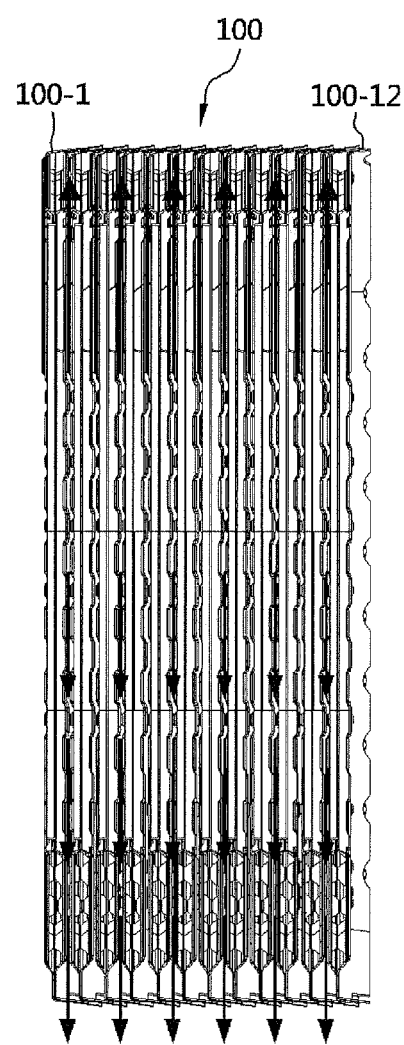
FIG. 6 is a cross-sectional view taken along the line A-A of FIG. 2.
Figure 7:
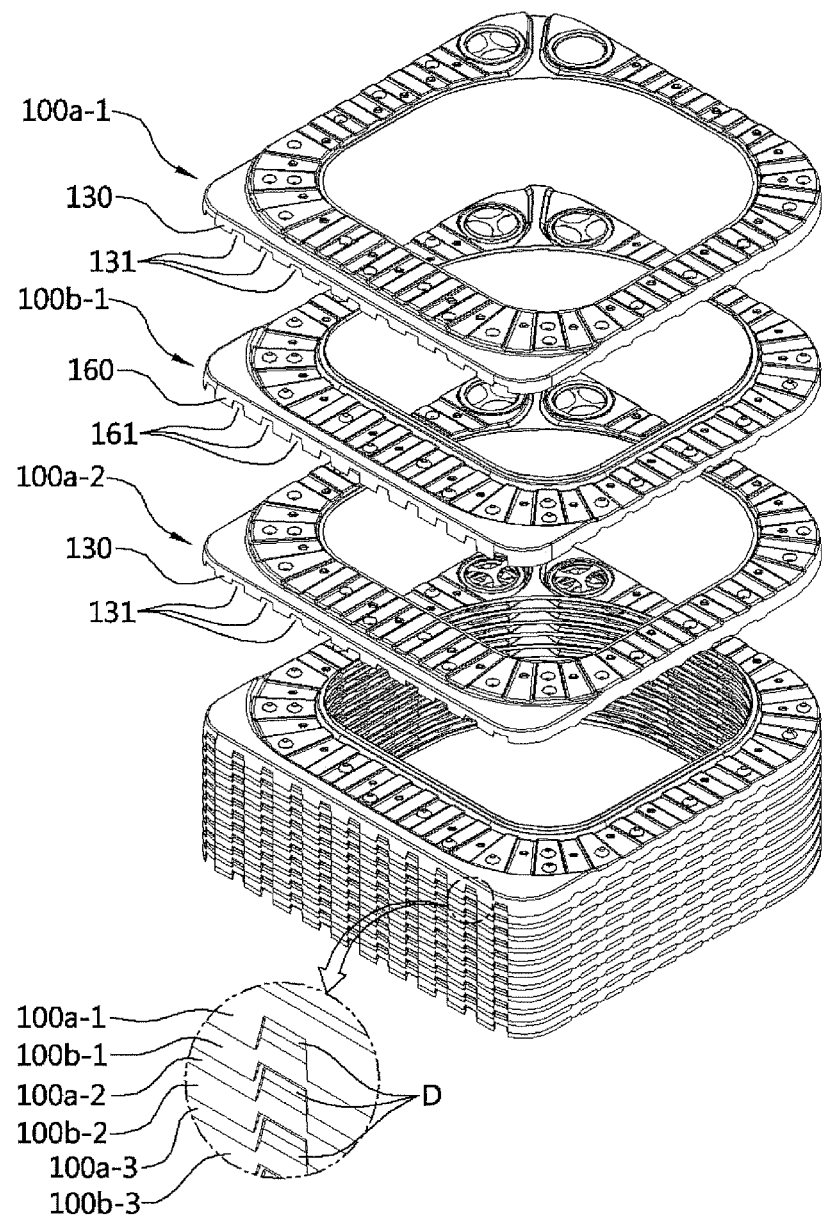
FIG. 7 is a partially exploded perspective view illustrating a state in which a combustion gas pass-through portion is formed at a lower portion of the heat exchanger.

Referring to FIGS. 6 and 7, the combustion gas generated by combustion of the burner in the combustion chamber C is discharged downward through the lower portion of the heat exchange part 100.

As a configuration for allowing the combustion gas to be smoothly discharged by passing through the combustion gas channels P2, when the first and second plates are stacked, the first flange 130 of the first plate and the second flange 160 of the second plate are partially overlapped with each other, and the combustion gas pass-through portion D through which the combustion gas, which is flowing by passing through the combustion gas channels P2, is discharged is formed at some regions of the edges of the first plate and the second plate.

A plurality of first incised portions 131 are formed at a combustion gas discharge side of the first flange 130, a plurality of second incised portions 161 are formed at a combustion gas discharge side of the second flange 160, and when the first plate and the second plate are stacked, the combustion gas pass-through portion D is formed at some regions of the first incised portion 131 and the second incised portion 161.

A plurality of combustion gas pass-through portions D are formed to be spaced apart from each other in lateral and longitudinal directions at the lower portion of the heat exchange part 100, and thus the combustion gas passing through the heat exchange part 100 may be distributed and discharged at a uniform flow rate across an entire region of the lower portion of the heat exchange part 100 such that flow resistance of the discharged combustion gas is reduced and noise and vibration are prevented.

Meanwhile, in a section where the flow direction of the heating medium is switched in the heat exchange parts 100-A, 100-B, and 100-C, that is, a section connected from the third heat exchange part 100-C to the second heat exchange part 100-B, or a section connected from the second heat exchange part 100-B to the first heat exchange part 100-A, a flow rate of the heating medium flowing to the heating medium channel P1 formed in each of the heat exchange parts 100-A, 100-B, and 100-C may tend to be non-uniformly distributed by inertia and pressure.

As described above, when a flow rate is non-uniformly distributed to the heating medium channels P 1, there are problems in that performance of heat exchange is degraded, and noise and foreign materials are generated due to boiling of the heating medium caused by local overheating in a region where the flow rate is low.

Figure 8:
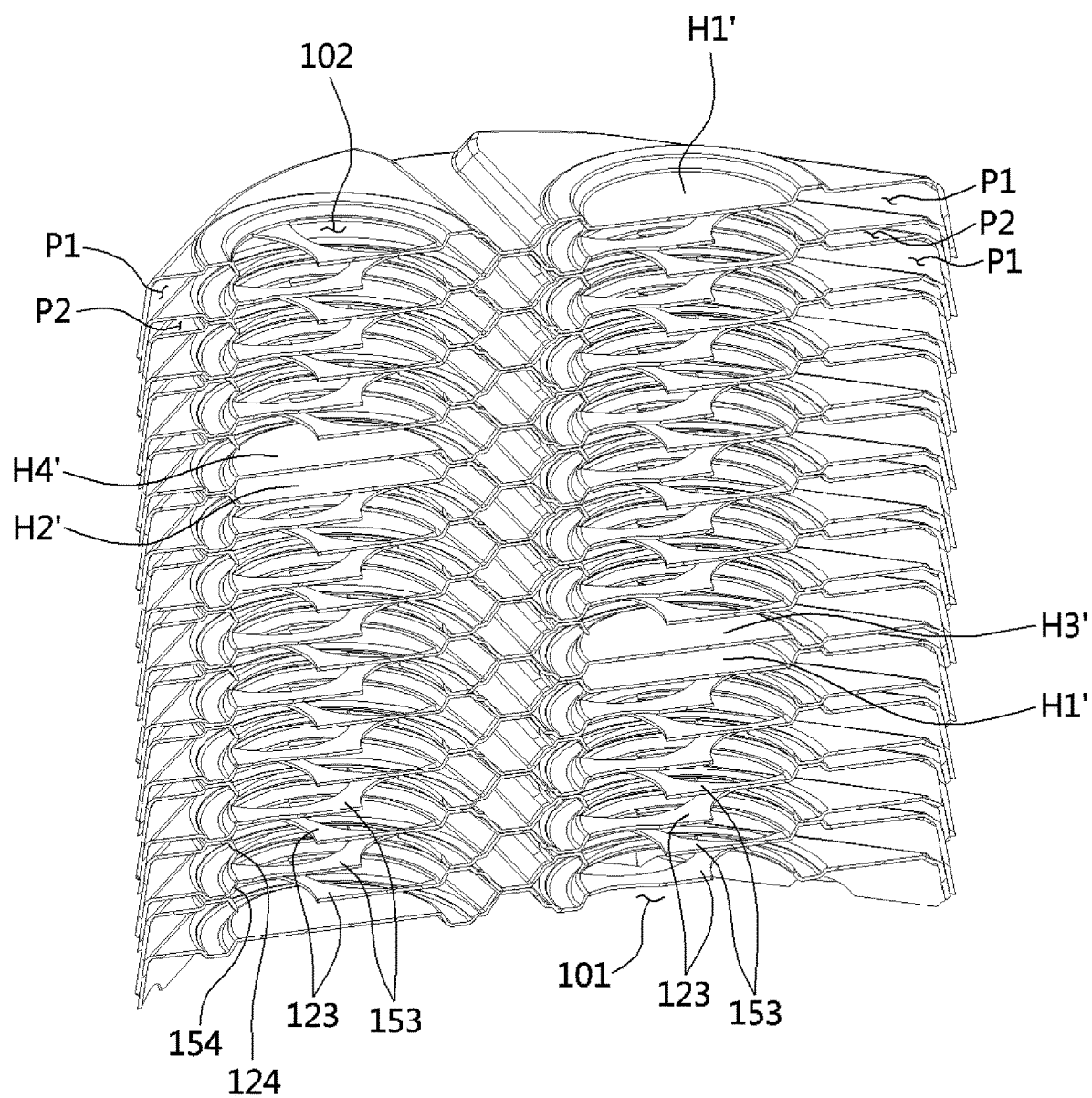
FIG. 8 is a cross-sectional perspective view taken along the line B-B in FIG. 2.

As a part for resolving the problem of non-uniform distribution in flow rate of the heating medium, as shown in FIGS. 8 and 9, heating medium dispersion portions 123 and 153, at which opened portions 123' and 153' and blocked portions 123" and 153" are formed, are provided at inlet parts through which the heating medium flows into the heating medium channel P1 or outlet parts through which the heating medium flows out from the heating medium channel P1.

A plurality of heating medium dispersion portions 123 and 153 are provided to be spaced apart in the flow direction of the heating medium, and the opened portions 123' and 153' and the blocked portions 123" and 153" are provided to intersect with each other along the flow direction of the heating medium between adjacently disposed heating medium dispersion portions 123 and 153.

The opened portions 123' and 153' and the blocked portions 123" and 153" are alternately formed in the heating medium dispersion portions 123 and 153 in a circumferential direction thereof.

Thus, as indicated by arrows in FIG. 9, the heating medium having passed through a first opened portion 123' formed at the first heating medium dispersion portion 123 is dispersed by colliding with a second blocked portion 153" of the second heating medium dispersion portion 153 located behind the first opened portion 123', and the heating medium having passed through a second opened portion 153' formed at the second heating medium dispersion portion 153 is dispersed by colliding with the first blocked portion 123" of the first heating medium dispersion portion 123 located behind the second opened portion 153', and inertia of the heating medium is alleviated by such a dispersion action so that a flow rate of the heating medium flowing to the heating medium channel P1 of each layer may be uniformly adjusted.

As another part for resolving the problem of non-uniform distribution in flow rate of the heating medium, as shown in FIGS. 8 and 10, heating medium distribution portions 124 and 154 are provided at portions of the heating medium channel P1 where the flow direction of the heating medium is switched, thereby narrowing the heating medium channel P1.

The heating medium distribution portions 124 and 154 may be formed in embossed shapes protruding toward the heating medium channel P1 at portions where the heating medium flows into and out from the heating medium channel P1.

Therefore, a cross-sectional area of a channel formed between a first heating medium distribution portion 124 formed at the first plate and a second heating medium distribution portion 154 formed at the second plate is formed to be narrower than a cross-sectional area of the heating medium channel P1 formed between the first plate and the second plate, and thus a phenomenon in which the heating medium is intensively flowed into some of the heating medium channels P1 of layers may be prevented so that a flow rate of the heating medium flowing through the heating medium channel P1 of each layer may be uniformly adjusted.

Meanwhile, referring to FIG. 4, the first protruding portion 120 formed at the first plate is configured such that a first protruding piece 120a and a second protruding piece 120b having different heights in a front-rear direction are alternately disposed along a circumferential direction, and the first recessed portion 150 formed at the second plate is configured such that a first recessed piece 150a and a second recessed piece 150b having different heights in the front-rear direction are alternately disposed along the circumferential direction. As described above, a stepped level is formed at each of the first protruding portion 120 and the first recessed portion 150 so that efficiency of heat exchange may be improved by inducing a turbulent flow to be actively generated in the flows of the heating medium and the combustion gas.

Referring to FIG. 11, a plurality of first protrusions 121 protruding toward the heating medium channel P1 are formed in the first protruding portion 120, and a plurality of third protrusions 151 protruding toward the heating medium channel P1 and being brought into contact with the plurality of first protrusions 121 are formed in the first recessed portion 150. Further, referring to FIG. 12, a plurality of second protrusions 122 protruding toward the combustion gas channel P2 are formed in the first protruding portion 120, and a plurality of fourth protrusions 152 protruded toward the combustion gas channel P2 and being brought into contact with the plurality of second protrusions 122 are formed in the first recessed portion 150. Thus, the first protrusion 121 and the third protrusion 151 protrude inward the heating medium channel P1 and are brought into contact with each other, and the second protrusion 122 and the fourth protrusion 152 protrude inward the combustion gas channel P2 and are brought into contact with each other so that efficiency of heat exchange may be improved by inducing a turbulent flow to be generated in the flows of the heating medium and the combustion gas, and at the same time, deformation of the plates due to a pressure of fluid may be prevented and pressure resistance performance may be improved.

Hereinafter, a configuration and an operation of a heat exchanger 1' according to another embodiment of the present invention will be described with reference to FIG. 13 to FIG. 16.

In the heat exchanger 1' according to the present embodiment, the heat exchanger part 100 according to the above-described embodiment serves as a sensible heat part 100A configured to heat a heating medium using sensible heat of a combustion gas generated by combustion of a burner, and a latent heat part 100B is integrally formed at one side of the sensible heat part 100A, wherein the latent heat part 100B is configured such that a latent heat part heating medium channel P3 through which a heating medium flows and a latent heat part combustion gas channel P4 through which a combustion gas having passed the combustion gas channel P2 of the sensible heat part 100A flows are alternately formed adjacent to each other in a space between a plurality of plates.

However, when compared with the heat exchange part 100 of the above-described embodiment, the sensible heat part 100A of the present embodiment has a configuration difference in which the heating medium inlet 101 formed at the second plate 100b-12 disposed at the rearmost chamber is formed in a blocked shape, and a heating medium connection channel configured to be connected to the latent heat part 100B is formed at one side of the sensible heat part 100A, but other configurations of the sensible heat part 100A may be the same as the configuration of the heat exchange part 100 of the above-described embodiment.

A second protruding portion 170 is formed to protrude from the first flat surface 110 to the front side at one side portion of the first plate where the latent heat part 100B is disposed, and a second recessed portion 180 is formed to protrude from the second flat surface 140 to the rear side at one side portion of the second plate where the latent heat part 100B is disposed, thereby forming the latent heat part heating medium channel P3 between the second protruding portion 170 and the second recessed portion 180.

Further, the second combustion gas channel P4 communicating with the first combustion gas channel P2 to allow the combustion gas to flow is formed between the second recessed portion 180 of a unit plate disposed at one side and the second protruding portion 170 of a unit plate disposed at another side.

The second protruding portion 170 and the second recessed portion 180 are formed in comb shapes bent in opposite directions so that the second protruding portion 170 and the second recessed portion 180 intersect with each other, and the latent heat part heating medium channel P3 and the latent heat part combustion gas channel P 4 are alternately formed adjacent to each other, and thus efficiency of heat exchange may be improved by promoting a turbulent flow to be generated in the flows of the heating medium and the combustion gas.

Referring to FIG. 14, a heating medium inlet 101' and through-holes H5 and H7 through which the heating medium flowing into the heating medium inlet 101' flows to the latent heat part heating medium channel P3 formed at each of the unit plates are formed at one side of a lower portion of the latent heat part 1008, and through-holes H6 and H8 through which the heating medium having passed through the latent heat part heating medium channel P3 flows to a third heat exchange part 100C' of the sensible heat part 100A are formed at one side of an upper portion of the latent heat part 100B.

Further, the first heating medium dispersion portion 123, the second heating medium dispersion portion 153, the first heating medium distribution portion 124, and the second heating medium distribution portion 154 are formed at each of the through-holes H5, H7, H6, and H8, thereby allowing the heating medium to be uniformly distributed to flow to the latent heat part heating medium channel P3 formed in each layer.

The latent heat part heating medium channel P3 may be connected in parallel between the heating medium inlet 101' into which the heating medium flows and the heating medium connection channel to reduce flow resistance of the heating medium.

Referring to FIG. 16, the heat exchanger 1' according to the present embodiment is configured in a stacked structure of a first heat exchange part 100-A', a second heat exchange part 100-B', and a third heat exchange part 100-C', and the heating medium having passed through the latent heat part 100B flows in both directions in the sensible heat part 100A of the third heat exchange part 100-C', flows in a counter-clockwise direction in the second heat exchange part 100-B', and flows in a clockwise direction in the third heat exchange unit 100-C'.

As described above, the latent heat part heating medium channels P3 may be formed in parallel in the latent heat part 100B to reduce flow resistance of the heating medium, and flows in some heat exchange parts 100-A' and 100-B' are directed to one direction in the sensible heat part 100A so that the heating medium circulates smoothly as in the above-described embodiment such that thermal efficiency can be improved by minimizing a pressure drop of the heating medium and preventing local overheating thereof.

Further, in accordance with the present embodiment, a plurality of plates are stacked to integrally configure the sensible heat part 100A and the latent heat part 100B such that the number of parts of a heat exchanger can be reduced, a production process can be simplified, and production automation can be achieved.

The invention claimed is:
1. A heat exchanger comprising:
a plurality of heat exchange parts in which a heating medium channel (P1), through which a heating medium flows, and a combustion gas channel (P2), through which a combustion gas combusted in a burner flows, are alternately formed adjacent to each other in a space between a plurality of plates,
wherein each of the heat exchange parts is configured to surround a space of a combustion chamber (C) provided at a central portion of each heat exchange part, and the plurality of heat exchange parts are stacked together to form a stacked structure,
wherein:
a heating medium inlet and a heating medium outlet are respectively formed on two opposite sides of an upper portion of each of the plurality of heat exchange parts,
a blocking wall is provided between the heating medium inlet and the heating medium outlet disposed adjacent to each other in each of the plurality of heat exchange parts,
the plurality of heat exchange parts include three adjacently stacked heat exchange parts, namely, a first heat exchange part, a second heat exchange part, and a third heat exchange part, which are arranged such that a heating medium outlet formed on the first heat exchange part faces a heating medium inlet formed on a second heat exchange part, and a heating medium outlet formed on the second heat exchange part faces a heating medium inlet of the third heat exchange part,
the plurality of plates constituting each of the heat exchange parts are provided to be upright along a longitudinal direction and are stacked in a front-rear direction,
the combustion gas generated by the combustion of the burner is discharged through a lower portion of each of the heat exchange parts,
the heating medium channels (P1) in the plurality of heat exchange parts are configured to allow the heating medium to flow in only one direction, and
a plurality of flanges each of which is formed to be bent at an edge of each of the plurality of plates, and a combustion gas pass-through unit (D) through which the combustion gas flowing in the combustion gas flow channel passes is formed at a part of an area of the edge of the plurality of plates in a state in which flanges of adjacent plates overlap, so that the combustion gas is distributed and discharged at a uniform flow rate through the combustion gas pass-through unit (D).

2. The heat exchanger of claim 1, wherein each of the heating medium channels (P1) of the plurality of heat exchange parts is formed to direct a flow of the heating medium in one direction, and the heating medium channels (P1) of adjacently stacked heat exchange parts among the plurality of heat exchange parts are formed to direct flows of the heating medium in opposite directions.

3. The heat exchanger of claim 1, wherein: the heating medium channels (P1) are formed in series between the plurality of heat exchange parts, and the heating medium channels (P1) are formed in parallel inside each of the plurality of heat exchange parts.

4. The heat exchanger of claim 1, wherein:
the plurality of plates are formed by stacking a plurality of unit plates, wherein a first plate and a second plate are stacked in each of the plurality of unit plates,
a first flat surface (110) having a first opening (A1) formed at a central portion thereof, a first protruding portion (120) formed to protrude from the first flat surface (110) to a front side and having sections being communicated in a circumferential direction, and a first flange (130) extending from an edge of the first flat surface (110) to a rear side are formed on the first plate, and
a second flat surface (140) having a second opening (A2) formed at a central portion thereof to correspond to the first opening (A1) in the front-rear direction and configured to be brought into contact with the first flat surface (110), a first recessed portion (150) formed to protrude from the second flat surface (140) to a rear side, having sections being communicated in a circumferential direction, and configured to form the heating medium channel (P1) between the first protruding portion (120) and the first recessed portion (150), and a second flange (160) extending from an edge of the second flat surface (140) to the rear side and configured to be coupled to the first flange (130) of a unit plate which is disposed next to the second plate are formed on the second plate.

5. The heat exchanger of claim 4, wherein:
through-holes (H1 and H3) located on one side and through-holes (H2 and H4) located on the other side for providing a heating medium connection channel to allow the heating medium to flow in one direction between adjacently stacked heat exchange parts,
blocked portions (H1' and H3') for inducing the heating medium flowing into the heating medium channel (P1) through the through-holes (H1 and H3) located on the one side to flow to the through-holes (H2 and H4) located on the other side via a circumference of the combustion chamber (C) in one direction, and
blocked portions (HZ and H4') for inducing the heating medium flowing into the heating medium channel (P1) through the through-holes (H2 and H4) located on the other side to flow to the through-holes (H1 and H3) located on the one side via the circumference of the combustion chamber (C) in an opposite direction are formed at one side of a portion of the heat exchange part.

6. The heat exchanger of claim 4, wherein:
the first protruding portion (120) is configured with a first protruding piece (120a) and a second protruding piece (120b), which are alternately disposed along a circumferential direction and have different heights in the front-rear direction, and
the first recessed portion (150) is configured with a first recessed piece (150a) and a second recessed piece (150b), which are alternately disposed along the circumferential direction and have different heights in the front-rear direction.

7. The heat exchanger of claim 4, wherein:
a plurality of first protrusions (121) protruding toward the heating medium channel (P1) are formed at the first protruding portion (120), and
a plurality of second protrusions (151) protruding toward the heating medium channel (P1) and being brought into contact with the plurality of first protrusions (121) are formed at the first recessed portion (150).

8. The heat exchanger of claim 4, wherein:
a plurality of first protrusions (122) protruding toward the combustion gas channel (P2) are formed on the first protruding portion (120), and
a plurality of second protrusions (152) protruding toward the combustion gas channel (P2) and being brought into contact with the plurality of first protrusions (122) are formed on the first recessed portion (150).

9. The heat exchanger of claim 1, wherein:

the heat exchanger serves as a sensible heat part (100A) configured to heat the heating medium using sensible heat of the combustion gas which is generated by the combustion of the burner, and a latent heat part (100B), in which a latent heat part heating medium channel (P3) through which the heating medium flows and a latent heat part combustion gas channel (P4) through which the combustion gas having passed through the combustion gas channel (P2) of the sensible heat part (100A) flows are alternately formed adjacent to each other in a space between the plurality of plates, is integrally formed at one side of the sensible heat part (100A).

10. The heat exchanger of claim 9, wherein:

a heating medium connection channel is formed between the sensible heat part (100A) and the latent heat part (100B), and the latent heat part heating medium channel (P3) is connected in parallel between a heating medium inlet (101') into which the heating medium flows and the heating medium connection channel.

11. The heat exchanger of claim 10, wherein:

a protruding portion (170) formed to protrude from a first flat surface (110) to a front side is provided at one side portion of a first plate on which the latent heat part (100B) is disposed, a recessed portion (180) formed to protrude from a second flat surface (140) to a rear side to form the latent heat part heating medium channel (P3) between the protruding portion (170) and the recessed portion (180) is provided at one side portion of a second plate on which the latent heat part (100B) is disposed, and the protruding portion (170) and the recessed portion (180) are formed in comb shapes bent in opposite directions.

* * * * *